(12) United States Patent
Howson et al.

(10) Patent No.: US 11,763,810 B2
(45) Date of Patent: *Sep. 19, 2023

(54) APPARATUS AND METHOD FOR RESIDENTIAL SPEAKER RECOGNITION

(71) Applicant: INTERDIGITAL MADISON PATENT HOLDINGS, SAS, Paris (FR)

(72) Inventors: Christopher Howson, Corps-Nuds (FR); Marie Guegan, Thorigne-Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 251 days.

This patent is subject to a terminal disclaimer.

(21) Appl. No.: 17/127,886

(22) Filed: Dec. 18, 2020

(65) Prior Publication Data

US 2021/0110828 A1 Apr. 15, 2021

Related U.S. Application Data

(63) Continuation of application No. 16/117,327, filed on Aug. 30, 2018, now Pat. No. 10,902,850.

(30) Foreign Application Priority Data

Aug. 31, 2017 (EP) .................................. 17306118

(51) Int. Cl.
   *G10L 21/00* (2013.01)
   *G10L 25/00* (2013.01)
   (Continued)

(52) U.S. Cl.
   CPC .............. *G10L 15/22* (2013.01); *G10L 15/26* (2013.01); *G10L 17/20* (2013.01); *H04L 12/282* (2013.01);
   (Continued)

(58) Field of Classification Search
   None
   See application file for complete search history.

(56) References Cited

U.S. PATENT DOCUMENTS 6,424,946 B1 7/2002 Tritschler et al.
6,751,590 B1 6/2004 Chaudhari et al.
(Continued)

FOREIGN PATENT DOCUMENTS

CN 101833951 A 9/2010
EP 1293964 A2 3/2003
(Continued)

OTHER PUBLICATIONS

Mekonnen, B. W., & Dufera, B. D. (Sep. 2015). Noise robust speaker verification using GMM-UBM multi-condition training. In AFRICON 2015 (pp. 1-5). IEEE.
(Continued)

*Primary Examiner* — Satwant K Singh

(57) ABSTRACT

A home assistant device captures voice signal expressed by users in the home and extracts vocal features from these captured voice recordings. The device collects data about the current context in the home and requests from an aggregator a background model that is best adapted to the current context. This background model is obtained and locally used by the home assistant device to perform the speaker recognition. Home assistant devices from a plurality of homes contribute to the establishment of a database of background models by aggregating vocal features, clustering them according to the context and computing background models for the different contexts. These background models are then collected, clustered according to their contexts and aggregated by an aggregator in the database. Any home assistant
(Continued)

device can then request from the aggregator the background model that fits best its current context, thus improving the speaker recognition.

17 Claims, 4 Drawing Sheets

(51) Int. Cl.
*G10L 15/22* (2006.01)
*H04L 12/28* (2006.01)
*G10L 17/20* (2013.01)
*G10L 15/26* (2006.01)
*G10L 25/48* (2013.01)

(52) U.S. Cl.
CPC ........ *G10L 25/48* (2013.01); *G10L 2015/228* (2013.01)

(56) References Cited

U.S. PATENT DOCUMENTS

| | | | |
|---|---|---|---|
| 6,772,119 B2 | 8/2004 | Chaudhari et al. | |
| 7,054,811 B2 | 5/2006 | Barzilay | |
| 9,042,867 B2 | 5/2015 | Gomar | |
| 9,626,971 B2 | 4/2017 | Rodriguez | |
| 9,697,828 B1 | 7/2017 | Prasad et al. | |
| 9,917,833 B2 | 3/2018 | Gomar | |
| 10,902,850 B2 * | 1/2021 | Howson | G10L 17/20 |
| 11,158,310 B2 * | 10/2021 | Hammons | G10L 15/30 |
| 2005/0256715 A1 | 11/2005 | Okimoto | |
| 2010/0217594 A1 | 8/2010 | Lee et al. | |
| 2012/0130716 A1 | 5/2012 | Kim | |
| 2015/0199960 A1 | 7/2015 | Gilcrest | |
| 2015/0208233 A1 | 7/2015 | Rui et al. | |
| 2017/0294191 A1 * | 10/2017 | Shi | G10L 15/30 |
| 2020/0160846 A1 * | 5/2020 | Itakura | G10L 15/14 |

FOREIGN PATENT DOCUMENTS

| | | |
|---|---|---|
| EP | 2048656 A1 | 4/2009 |
| GB | 2471875 A | 1/2011 |
| KR | 101564087 B1 | 10/2015 |
| WO | 2015081681 A1 | 6/2015 |

OTHER PUBLICATIONS

Cao, Y., et al. (Oct. 2014). A novel speaker verification approach for certain noisy environment. In 2014 12th International Conference on Signal Processing (ICSP) (pp. 549-554). IEEE.

Reynolds, D. A., et al. (2000). Speaker verification using adapted Gaussian mixture models. Digital signal processing, 10(1-3), 19-41.

* cited by examiner

APPARATUS AND METHOD FOR RESIDENTIAL SPEAKER RECOGNITION

CROSS-REFERENCE TO RELATED APPLICATIONS

The present application is a continuation of U.S. patent application Ser. No. 16/117,327, entitled "APPARATUS AND METHOD FOR RESIDENTIAL SPEAKER RECOGNITION" and filed Aug. 30, 2018, which claims priority from European Patent Application No. 17306118.5, entitled "APPARATUS AND METHOD FOR RESIDENTIAL SPEAKER RECOGNITION", filed on Aug. 31, 2017, both of which are hereby incorporated by reference in its entirety.

TECHNICAL FIELD

The present disclosure relates to the domain of residential speaker recognition.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The use of voice control in the residential environment through home assistants such as Amazon Echo or Google Home has now become a mass market reality; such devices are present in millions of homes. Such connected products include microphones to capture natural speech from users of the household and provide services according to the interpreted content. Certain use cases require a speaker recognition feature to allow personalizing content playback, authorizing network configuration or exercising parental control.

A technique commonly used for speaker recognition in the literature is the GMM-UBM approach. This is based on representing speakers with Gaussian Mixture Models (GMM). A Universal Background Model (UBM) is an alternate speaker model that represents speakers other than the target person to be recognized. The UBM is a large GMM trained using audio features from a number of speakers with characteristics representative of the expected range of non-target speakers. Target speakers are enrolled by training individual GMMs which are adapted from the UBM. The speaker recognition process compares features extracted from a test audio sample against all the target GMMs and the UBM to determine which model is the most likely representation, thereby inferring that the speaker is either one of the targets (best match is an individual GMM) or unknown (best match is the UBM). A good UBM should therefore be representative of possible non-target users (visitors that are unknown to the system): regional accent, typical age, etc. Also, for better performances it should ideally be built from audio recordings that were captured in a similar environment: type of microphone, noise in the room, reverberation, etc. These elements of context are more or less specific to the home and may also evolve over time (season, day of the week, hour of the day, holiday period, etc.). For example, when windows are opened, they may introduce background noise coming from the home surroundings. This background noise is different from the background noise when windows are closed and may disturb the recognition or at least lower the recognition rate. Other types of background noises may be induced for example by an operating washing machine, a teenager listening to music in his bedroom, birds singing in their birdcage, etc.

Conventionally, the audio for speaker modelling is acquired in different ways: recorded in studio conditions from a supposedly representative population sample, recorded from telephone conversations, recorded through the use of a mobile app, or recorded from broadcast radio/TV programs. Once the audio is acquired from a range of non-target speakers, features are extracted which are used as the inputs to the background model. A single background model may be created from the features of all speakers or a background model may be created by combining separate background models for selected speaker categories (e.g. males/females). Such technique to build a background model however suffers from at least the following weaknesses: the audio is not recorded in the residential environment and thus does not reflect typical acoustic conditions or the type of speech expected, the audio is not recorded with the microphone of the residential equipment, the background model is wide-ranging and not specific to the expected range of speakers for a particular home and/or context, the background model is calculated once and does not evolve over time or according to context.

Furthermore, some speaker identification systems, including for example Microsoft's Speaker Recognition API that relies on cloud-based technologies, have the drawback of requiring the user's raw audio to be uploaded to the cloud. Some privacy-aware users may be reluctant to adopt such technology.

In the publication entitled "A novel speaker verification approach for certain noisy environment" (ICSP2014), CAO, Yiming ET AL., present an approach for speaker verification based on Gaussian Mixture Model-Universal Background Model (GMM-UBM) algorithm. Noisy background adaption is proposed to make speaker models closer to the one in real-world scenarios.

It can therefore be appreciated that there is a need for a solution for residential speaker recognition that addresses at least some of the problems of the prior art. The present disclosure provides such a solution.

SUMMARY

The present disclosure describes an apparatus and a method for residential speaker recognition. A home assistant device captures voice signal issued by users in the home and extracts vocal features from these captured voice recordings. The device collects data characterizing the current context in the home and requests from an aggregator a background model that is best adapted to the current context. This background model is obtained and locally used by the home assistant device to perform the speaker recognition, thus improving the recognition performances since this background model is built by aggregating background models from a plurality of homes in similar contexts.

Home assistant devices from a plurality of homes contribute to the establishment of a database of background models. Each home assistant device aggregates vocal features, clusters them according to the context and computes background models for the different contexts. These background models are then collected, clustered according to their contexts and aggregated by an aggregator in the database. Any home assistant device can then request from the aggregator the background model that fits best its current context, thus improving the speaker recognition. Since only background models are collected by the aggregator (and no raw data), user privacy is fully preserved.

In a first aspect, the disclosure is directed to a method for performing speaker recognition comprising extracting vocal features from a captured audio signal representing a user utterance, obtaining a capture context, said context comprising a set of features characterising the capture environment at the time of the utterance, obtaining a background speaker model of utterances wherein the background speaker model is selected from a plurality of clusters of background speaker models, the clustering of background speaker models being performed according to capture contexts associated to a plurality of collected background speaker models, the selection being performed according to a closest match between the capture context and contexts associated to the clusters of background speaker models, and performing speaker recognition using the selected background model.

In a second aspect, the disclosure is directed to a device for performing speaker recognition, comprising a microphone configured to capture an audio signal representing a user utterance, memory configured to store at least background models trained using vocal features from a plurality of non-target speakers and trained individual models of the speakers to be recognized, a hardware processor configured to extract vocal features from the captured audio signal, obtain a capture context, said context comprising a set of features characterising the capture environment at the time of the utterance, obtain a background speaker model of utterances wherein the background speaker model is selected from a plurality of clusters of background speaker models, the clustering of background speaker models being performed according to capture contexts associated to a plurality of collected background speaker models, the selection being performed according to a closest match between the capture context and contexts associated to the clusters of background speaker models, and perform speaker recognition using the obtained background model $24a'$.

In a third aspect, the disclosure is directed to an aggregator comprising a hardware processor configured to collect local contextual background models from a plurality of devices and associated contexts, said context comprising a set of features characterising the capture environment at the time of an utterance, aggregate the obtained local contextual background models, cluster the aggregated local contextual background models according to their contexts, compute for each cluster a global contextual background model, and store the computed global contextual background models in a database. In a variant embodiment of third aspect, the aggregator is further configured to obtain from a home assistant device a context, select a global contextual background model for which the context is the closest context to the received context, and provide selected global contextual background model to the home assistant device.

In a fourth aspect, the disclosure is directed to a computer program comprising program code instructions executable by a processor for implementing any embodiment of the method of the first aspect.

In a fifth aspect, the disclosure is directed to a computer program product which is stored on a non-transitory computer readable medium and comprises program code instructions executable by a processor for implementing any embodiment of the method of the first aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

Figure 1:
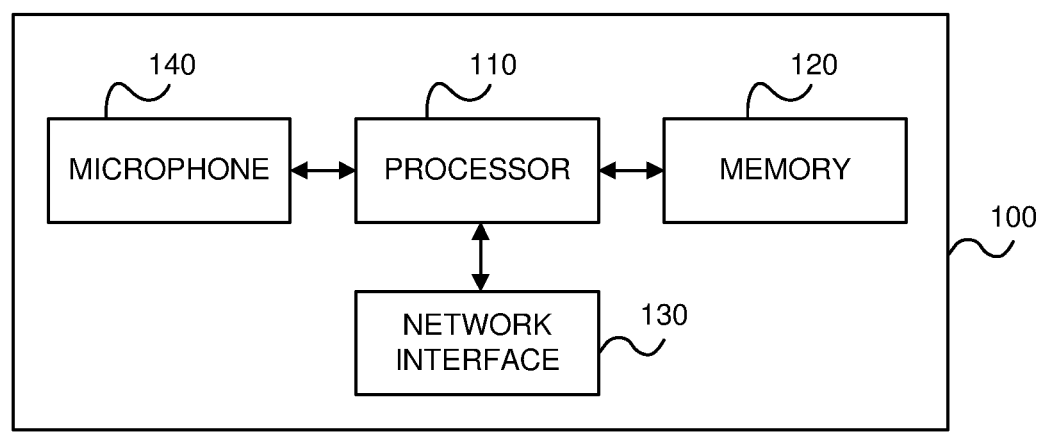
FIG. 1 illustrates an exemplary receiver device in which at least part of the disclosure may be implemented.

FIG. 1 illustrates an exemplary home assistant device 100 in which at least part of the disclosure may be implemented. The person skilled in the art will appreciate that the illustrated device is simplified for reasons of clarity. According to a specific and non-limiting embodiment of the principles of the disclosure, the home assistant device 100 comprises at least one hardware processor 110 configured to execute a method of at least one embodiment of the present disclosure, memory 120 configured to store data needed to execute a method of at least one embodiment of the present disclosure, a network interface 130 configured to interact with remote devices and a microphone 140 configured to record an audio signal corresponding to the voice of a speaking user. The network interface 130 interfaces with in-home devices such as motion sensors or surveillance cameras. Bluetooth™, Zig Bee, or Wi-Fi are examples of network technologies that may be used for this purpose. The network interface 130 also interfaces with out-of-the-home devices such as data servers on the Internet. ADSL, cable modem, 3G or 4G are examples of network technologies that may be used for this purpose. Other network interfaces may be used.

The home assistant device 100 can be provided as a standalone device but can be integrated in a more conventional consumer device such as a set-top box, a gateway, a television, a computer, a smartphone, a tablet, etc.

Figure 5:
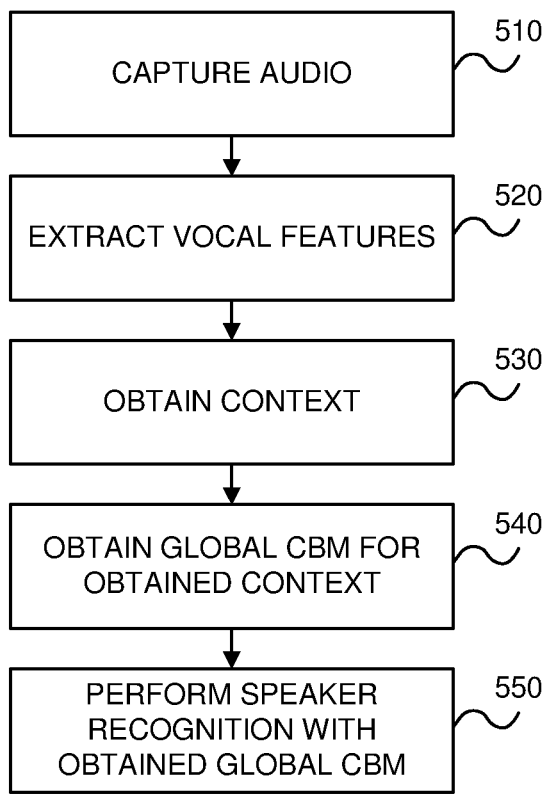
FIG. 5 illustrates an exemplary flowchart of a home assistant device performing speaker recognition according to an embodiment of the disclosure.
Figure 6:
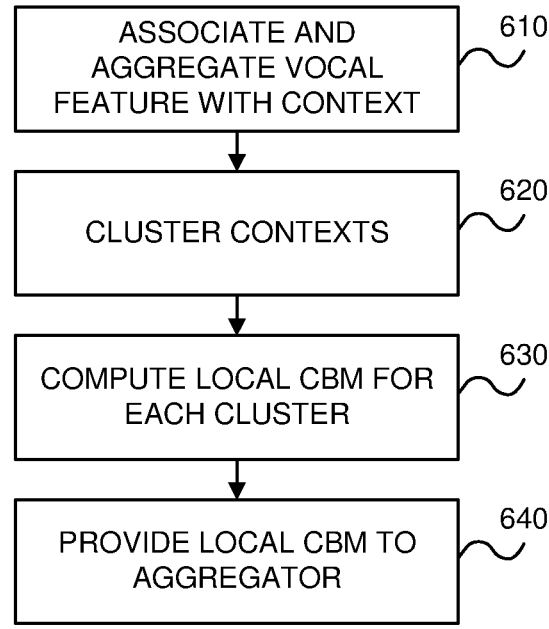
FIG. 6 illustrates an exemplary flowchart of a home assistant device preparing the local contextual background model according to an embodiment of the disclosure.

A non-transitory computer readable storage medium not illustrated stores computer readable program code comprising at least an application that is executable by the processor 110 to perform the speaker recognition operation according to the method described in the FIGS. 5 and 6.

Figure 2:
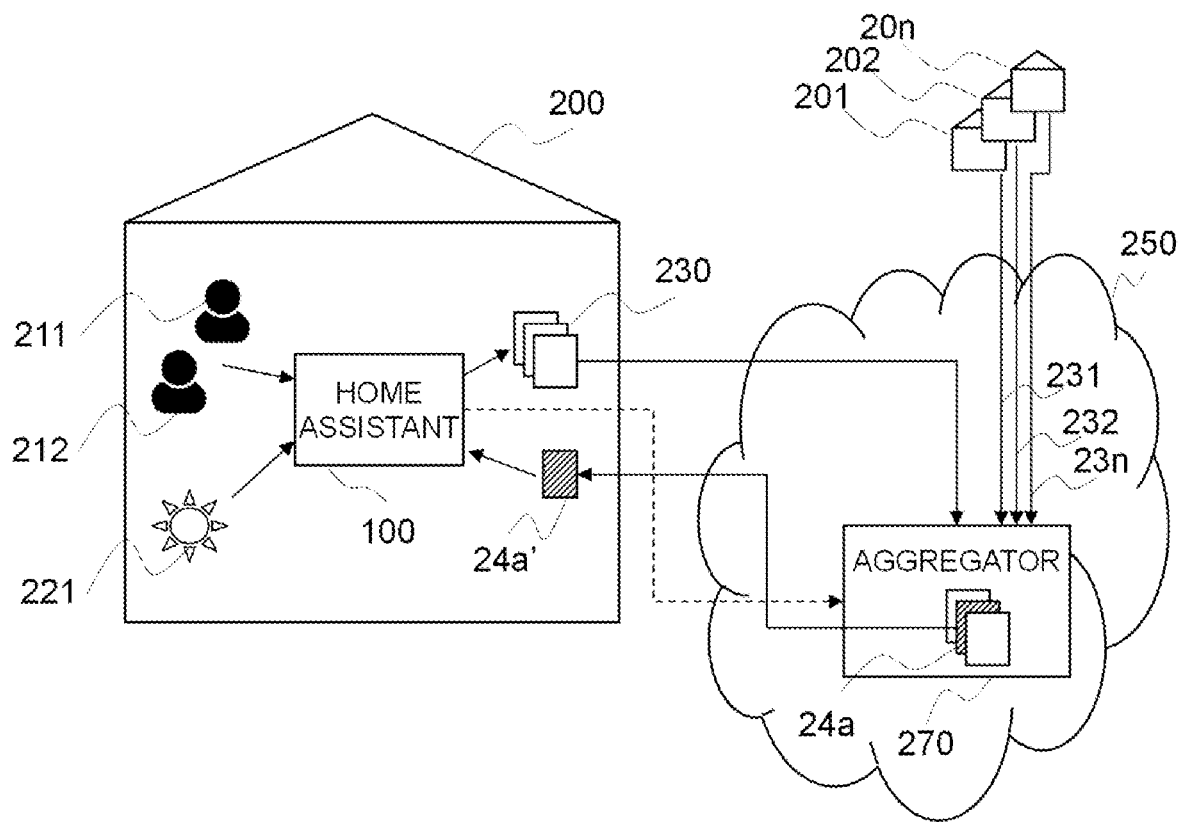
FIG. 2 illustrates a diagram of a receiver device according to an embodiment of the disclosure.

FIG. 2 illustrates an exemplary system in which an embodiment of the disclosure may be used. The home assistant device 100 receives vocal utterances (queries, commands, etc) expressed by users 211, 212. The home assistant device 100 performs voice recognition and determines appropriate queries to be performed, either using in-home devices (e.g.: muting the sound of the TV off, closing shutters, etc.) but also out-of-home devices (e.g.: retrieving the weather forecast or stock values, getting help about a device failure, etc.). In addition, the home assistant device 100 also performs speaker recognition. Such recognition enables multiple features such as access control (e.g.:

a kid cannot configure the home network, cannot access adult movies, etc.), personalisation of the interactions (e.g.: vocabulary can be adapted to the category of speaker between young kids, teenagers, adults, senior persons).

The home assistant device 100 also collects the context 221. Context 221 is a combination of metadata, including at least the location of the house, the number of inhabitants, information about each inhabitant (gender, age, language spoken, etc) and pets, type of microphone used, presence or absence of guests (including gender, age and language of the guests), the day of the week, hour of the day, state of doors and windows openings, operating state of home devices (television, washing machine, etc), acoustic characteristics of the room where the audio is captured, etc.

The context may be determined in different ways, for example through home automation devices and sensors (motion sensors, door contacts, RFID readers, etc.) and corresponding home automation applications able to count the number of people present in the home, by accessing social network platforms able to provide the agendas of the users (indicators of the presence of guests during the week or of a party for a child's birthday for instance), etc. In such environment, the composition of the household is known at any time. These metadata describe a general context in which the recording of utterances for speaker recognition was made. The context may be stored in a feature vector format.

In an embodiment, the elements of the context, or a subset of these elements, are determined manually by the user itself, for example through a dedicated user interface on a device of the household such as a television, a smartphone, or a tablet.

Figure 3:
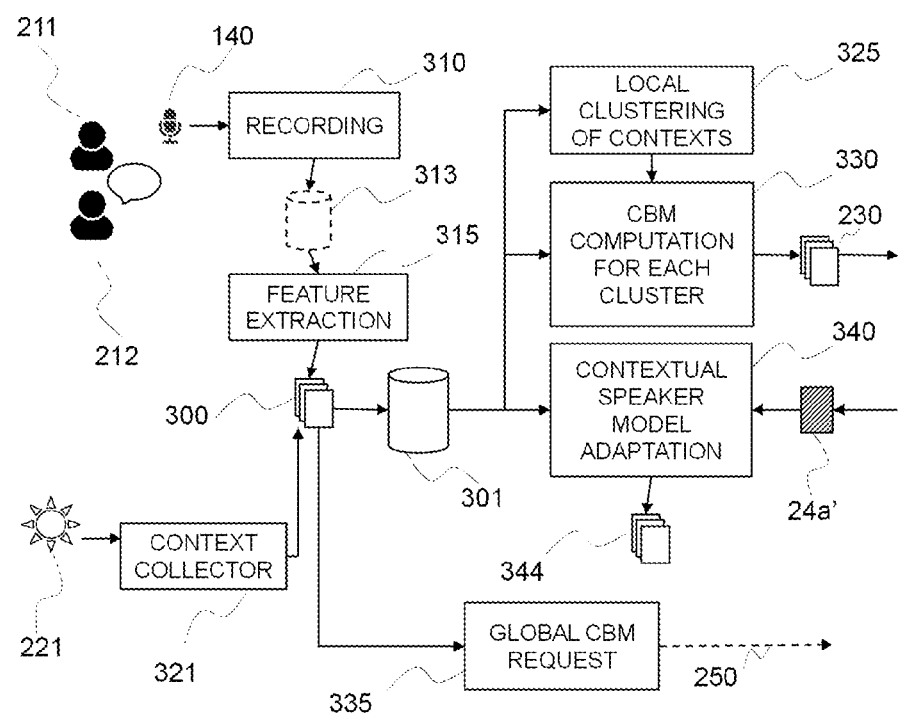
FIG. 3 illustrates an exemplary implementation of home assistant device performing the speaker recognition with contextual background models.

Speaker recognition is preferably performed using the universal background model previously introduced. To improve the speaker recognition, the background model that is used should have been computed from recordings made in the same context. To that objective, each home 200, 201, 202, 20n provides a local background model related to the current context as well as a representation of the context, hereafter named local contextual background model. The local contextual background models from multiple homes are collected, for example by an aggregator 270 or a service provider, clustered according to the context and stored in a database 240 (FIG. 4) so that a home assistant device can request 250 to the aggregator 270 a global contextual background model for a given context. The aggregator will select the contextual background model 24a whose context is the closest to the given context, retrieve it and provide it to the home assistant device. The home assistant device will use the contextual background model locally 24a' to improve the speaker recognition. FIG. 3 illustrates an exemplary implementation of a home assistant device performing speaker recognition with contextual background models. Before being able to perform recognition, an initialisation phase is required. The home equipment is delivered with one or more generic universal background models incorporated as files. There could, for example, be universal background models for different languages or for different regional accents, or for different periods of the year (seasons), etc. It is proposed to use different universal background model would thus be used depending for instance on the language used and the season, the composition of the household at the time of the utterance, etc. Taken altogether, these factors are part of the context. The different background models are hereafter named contextual background models (CBM). An enrolment phase for family members (target users to be recognized) is required in which the user identity is input together with at least, for example, a minimal amount of recorded speech per person (typically one minute but less can be sufficient). In one embodiment, the user is prompted to repeat phrases that are "spoken" by the home equipment or displayed on the screen of a home equipment. Features are extracted from the spoken audio for each target user and are recorded in the home equipment to be used initially to generate speaker models and, subsequently, to update speaker models each time a different CBM is used. The raw audio can be discarded once the features are extracted thereby ensuring user privacy.

Recording 310: When the system is operational, utterances made in the home by any of the users 211, 212 are recorded by means of a at least one microphone 140. A plurality of microphones can also be used for improved recording. The microphone 140 is advantageously integrated in the home assistant device 100 or connected to that device through the network interface (130 in FIG. 1) or a dedicated interface. The initiation of the recording of voice may rely on a voice activity detection process or on detection of a wake-up word (e.g. "Alexa", "OK Google"). The recording terminates when, for example, a voice activity detection process infers absence of speech for a threshold number of seconds. The captured audio is stored temporarily as a file 313 in the home equipment or in another network connected equipment within the home. In one embodiment, the recorded audio is stored as a 16 kHz, 16-bit PCM way file.

Feature extraction 315: Feature extraction is performed on the stored audio files. Once the feature extraction for a captured audio file is completed, the audio file is deleted, thereby guaranteeing user privacy, and a feature file 300 is generated and stored. In one embodiment, the extracted features express audio characteristics as Mel-frequency cepstral coefficients (MFCCs). In another embodiment, further audio analysis infers non-audio features such as, for example, the gender of the speaker. In another embodiment, further external features are collected to help voice recognition such as, for example, the identifier of connected devices in the home at the time of the recording. Those generated metadata may be used to enhance the context.

Feature and context storage 301: Audio features extracted from captured audio recordings are stored together and are associated with the metadata (feature vectors) expressing the home context at the time of recording, these metadata being collected 321 using different techniques mentioned in the disclosure. The storage includes the special case of the speaker enrolment data created during initialisation, which are needed to re-generate speaker models every time a new CBM is used. A counter is also stored, indicating the number of seconds of audio that have been processed.

Local clustering of contexts 325: Machine learning techniques are used, either by means of supervised classification or unsupervised clustering, to cluster the contexts that have been observed in this home into a number of clusters. Since contexts may be expressed as feature vectors, any type of machine learning classification technique such as k-means, hierarchical classification, etc. can be used. Once the clusters are obtained, each cluster is assigned a representative context following a method such as the centroid method.

Local CBM computation 330: For each contextual cluster, provided that the related audio data is available for a sufficient number of seconds, a CBM is computed using the related audio features. In one embodiment, this threshold is 300 seconds and the speaker CBM is implemented as a GMM. Local CBMs are aggregated 230 for a single home and are uploaded to an aggregator. The only data leaving the home is a statistical representation of audio features accompanied with anonymous metadata expressing the context. No audio recordings leave the home and the audio files are always deleted once the features are extracted. Such an approach guarantees user privacy.

Global CBM request 335: In order to undertake speaker recognition, the home equipment requests and downloads one or more CBMs from the cloud service. The appropriate CBM is selected in the home equipment according to the current context. This module examines the context collected by the context collector and compares it to the context of the currently used CBM. If it becomes sufficiently different (for example the difference is greater than 10%), a request 250 for a new global CBM is triggered. In this way, the speaker recognition is adjusted not only to macroscopic context, such as the town or neighbourhood, but also to smaller scale context revolving around the activity of the home (e.g. detected TV viewing, detected presence of a portable network device, type of microphone, . . . ). The current context in the home is provided with the request 250, the best matching global CBM 14a is retrieved from a database 240 aggregating all CBMs (please refer to description of FIG. 4) and provided to the home assistant device. The context is represented as, for example, a feature vector which is compared to vector representations of the centroids of the global context clusters to determine the closest matching context such that the appropriate CBM may be downloaded. The distance measure used to compare context feature vectors may be the Euclidian distance.

Contextual speaker model adaptation 340: Whenever a new CBM is downloaded, corresponding speaker models 344 for each target (family member) are calculated in the home equipment using the audio features extracted and stored during initialisation. In one embodiment target speaker models are calculated by means of Maximum a posteriori (MAP) adaptation of the global CBM 14a in FIG. 3. Speaker models may be stored in the home equipment to avoid the need for re-calculation in the case of selecting a previously used CBM.

Figure 4:
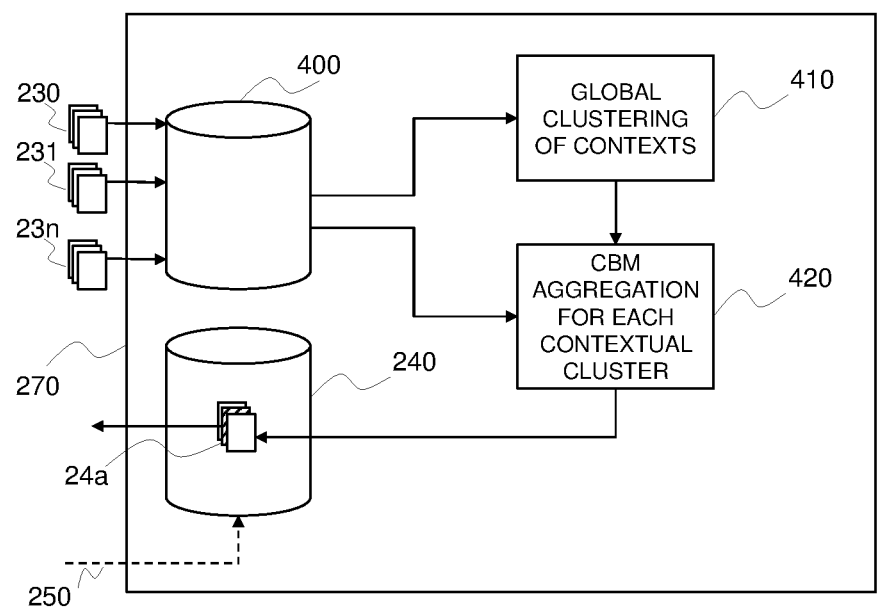
FIG. 4 illustrates an exemplary implementation of aggregation of local contextual background models.

FIG. 4 illustrates an exemplary implementation of aggregation of local contextual background models. This aggregation may be done for example by a service provider in an aggregator 270, implemented as a standalone generic computer, as dedicated hardware or as a software service in the cloud. The aggregator 270 stores in a database 400 the local CBMs 230, 231, 23n aggregated from a plurality of homes.

Global clustering of contexts 410: Machine learning techniques are used, either by means of supervised classification or unsupervised clustering, to cluster the contexts that have been observed in the plurality of homes into a number of clusters. Since contexts may be expressed as feature vectors, one may use any type of machine learning classification technique such as k-means, hierarchical classification, etc. Once the clusters are obtained, each cluster is assigned a representative context following a method such as the centroid method. The method may not necessarily be the same as in the "Local clustering of contexts" step.

CBM aggregation 420: A cloud CBM service implements the combination of single-home contextual speaker CBMs to create one or more global CBMs. The CBMs are constructed according to the clustering of the local representative contexts described in the previous step. All single-home CBMs belonging to a cluster are agglomerated to a single CBM, associated with the representative context of the cluster and stored in a database 240. In one embodiment, this is achieved by agglomerating the CBM Gaussians and renormalizing the mixture weights. Then, a home assistant device can request 250 the aggregator to select and provide the global CBM 24a for which the context best fits the context provided in the request 250, so that a copy 24a' of the most appropriate global CBM can be used locally.

FIG. 5 illustrates an exemplary flowchart of a home assistant device performing speaker recognition according to an embodiment of the disclosure. In step 510, the home assistant device 100 captures an audio signal representing a voice command expressed by user 211, 212. In step 520, it extracts vocal features from the captured audio signal and, in step 530, obtains the context. In step 540, the home assistant device queries an aggregator 270, providing the context previously determined and receives the global CBM that best corresponds to the context. This global CBM is then used, in step 550, to perform the speaker recognition and provides better results than a universal background model since the background model is adapted to the current context.

In an alternate embodiment, the home assistant device queries for a new global CBM only if the context becomes sufficiently different (for example the difference is greater than 10%).

In an alternate embodiment, the home assistant device may iterate periodically on the succession of steps 530, 540 and 550 in order to adapt nearly continuously its background model to the evolving context, therefore always having the most appropriate model ready to perform the speaker recognition.

FIG. 6 illustrates an exemplary flowchart of a home assistant device preparing the local contextual background model according to an embodiment of the disclosure. In step 610, the home assistant device 100 associates a new vocal feature with the current context. All such couples are aggregated into the storage 301 and clustered, in step 620, according to the different contexts. In step 630, for each cluster, a local CBM is generated and this model is provided to an aggregator 270 in step 640.

Providing this information to an aggregator enables to build a better model thanks to the plurality of homes with a variety of contexts. This model will then be shared by a community of users and benefits to all home assistant devices participating in this community since it will allow to improve the speaker recognition in a win-win situation, without impacting the user privacy.

Figure 7:
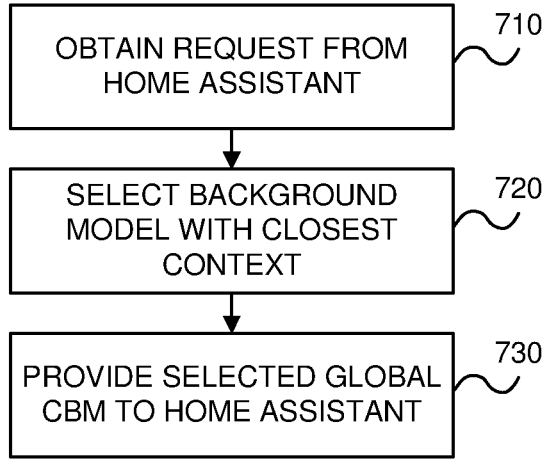
FIG. 7 illustrates an exemplary flowchart of an aggregator selecting the appropriate background model for a home assistant device according to an embodiment of the disclosure.

FIG. 7 illustrates an exemplary flowchart of an aggregator selecting the appropriate background model for a home assistant device according to an embodiment of the disclosure. In step 710, the aggregator 270 receives a request from a home assistant device 100, the query comprising the current context in which the user of the home assistant device expressed a voice query. In step 720, the aggregator selects from the database 240 storing all global CBMs the model whose context is closest to the context comprised in the received query. In step 730, the aggregator replies to the home assistant and provides the closest model.

Figure 8:
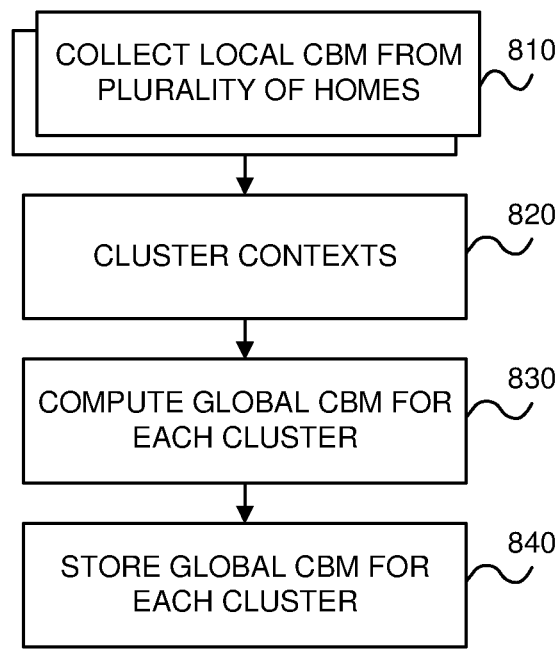
FIG. 8 illustrates an exemplary flowchart of an aggregator preparing the global contextual background models according to an embodiment of the disclosure.

FIG. 8 illustrates an exemplary flowchart of an aggregator preparing the global contextual background models according to an embodiment of the disclosure. In step 810, the aggregator receives local CBMs from a plurality of homes. In step 820, the aggregator clusters the aggregated models according to their context. This is done when an appropriate number of new models have been received (for example 100 models or 1 million models) or can be performed periodically (for example each day or once per week) or upon an arbitrary decision triggered by a human operator. In step 830, for each cluster, a global CBM is computed based on set of vocal features corresponding to the cluster and stored, in step 840, in the database 240.

The aggregator 270 may be implemented as a standalone generic computer, as dedicated hardware or as a software service in the cloud. It comprises a hardware processor configured to perform the tasks described above, memory to store the data related to these tasks and a network interface to communicate with the plurality of home assistant devices. It comprises or interfaces with a database 240 storing the global CBMs.

The previous paragraphs describe the key functional elements which compute a representative context-adapted speaker background model for a home. This model is employed for speaker recognition in the home assistant device 100 by initially recording a voice command and extracting audio features as described above. The raw audio is discarded and the features are then used to determine whether the speaker is most probably one of the enrolled individuals (family members) or not. In one embodiment, this determination is done by means of log-likelihood-ratio (LLR) tests of the features comparing each enrolled speaker model to the alternate model (CBM). This gives an LLR score for each enrolled speaker model compared to the alternate model and it is inferred that the test speaker corresponds to the enrolled speaker for the model yielding the highest LLR score, provided a threshold value is exceeded. If all scores are inferior to the threshold it is inferred that the test speaker is not one of the enrolled speakers.

In an alternate embodiment, audio features and context metadata are uploaded to the aggregator and all calculations are performed remotely, for example in the cloud. Such solution permits to reduce the required processing capabilities of the home assistant device but still preserves the privacy of the user since the audio recordings are not uploaded.

The disclosure proposes to improve the speaker recognition by using a background model that must be representative of visitors to the home, excluding the target speakers. This entails building a sufficiently large audio data set which models the acoustic space in terms of speaker gender, age, language, accent, type of speech (e.g. short commands rather than read text), type of microphone, etc. Aggregating background models from a plurality of homes provides immediate access to a plurality of varied background models.

The disclosure describes the application in the domain of residential speaker recognition but the principles also apply to other domains (for example: professional environment, learning environment, etc).

As will be appreciated by one skilled in the art, aspects of the present principles and features described above can take the form of an entirely hardware embodiment, an entirely software embodiment (including firmware, resident software, micro-code and so forth), or an embodiment combining hardware and software aspects.

In variant embodiments of first aspect:
the method further comprises associating extracted vocal features to corresponding context as a couple and aggregating this couple with couples of vocal features and corresponding context previously obtained, clustering the aggregated vocal features according to contexts, computing a background model from the vocal features of each clustered context to generate a local contextual background model, and providing the local contextual background models,
the global contextual background models are generated by aggregating local contextual background models obtained from a plurality of devices, clustering the aggregated local contextual background models according to their contexts, computing for each cluster a global contextual background model and aggregating the computed global contextual background models,
obtaining a global contextual background model associated to the obtained context when changes between current context and previous context are higher than a threshold,
the background model is a Gaussian mixture model trained using vocal features from a plurality of speakers with characteristics representative of an expected range of speakers not to be recognized,
speakers to be recognized are enrolled by training individual background models,
the speaker recognition is performed by comparing vocal features extracted from a user vocal query against a plurality of trained individual background models and the obtained global contextual background model to determine which model is the most likely representation, thereby inferring that the speaker is either one of the enrolled speakers or is unknown.

In a first embodiment of second aspect, the device further comprises associating extracted vocal features to corresponding context and aggregating them with vocal features and context previously obtained, clustering the aggregated vocal features according to contexts, computing a background model from the vocal features of each clustered context to generate a local contextual background model, and providing the local contextual background models. In a variant embodiment of first aspect, the device further comprises a network interface configured to provide the local contextual background models to a second device, request a global contextual background model corresponding to a current context, and obtain the global contextual background model from a second device wherein global contextual background models are generated by aggregating local contextual background models obtained from a plurality of devices, clustering the aggregated local contextual background models according to their contexts, computing for each cluster a global contextual background model and aggregating the computed global contextual background models.

The invention claimed is:

1. A method to perform speaker recognition comprising:
extracting vocal features from a captured audio signal representing a user utterance;
obtaining a capture context, the capture context comprising a set of features characterizing a capture environment at a same time of the user utterance;
obtaining a background speaker model selected from a plurality of background speaker models according to the capture context; and
performing speaker recognition using the selected background speaker model.

2. The method of claim 1, wherein the capture context is based at least on information chosen from a set comprising: the location of a house where the audio signal is captured, the number of inhabitants, gender, age, language spoken of inhabitants, and information about pets.

3. The method of claim 1, wherein the capture context is based at least on a type of microphone used for capturing the audio signal.

4. The method of claim 1, wherein the capture context is based at least on acoustic characteristics of a room where the audio signal is captured.

5. The method of claim 1, wherein the capture context is based at least on the presence or absence of guests.

6. The method of claim 1, wherein the capture context is based at least on the day of the week and hour of the day of the capture time.

7. The method of claim 1, wherein the capture context is based at least on data obtained from home automation devices and sensors.

8. The method of claim 1, wherein the capture context is based at least on at least one agenda of an inhabitant.

9. An apparatus comprising:
- a processor; and
- a non-transitory computer-readable medium storing instructions operative, when executed by the processor, to cause the apparatus to:
  - extract vocal features from a captured audio signal representing a user utterance;
  - obtain a capture context, the capture context comprising a set of features characterizing a capture environment at a same time of the user utterance;
  - obtain a background speaker model selected from a plurality of background speaker models according to the capture context; and
  - perform speaker recognition using the selected background speaker model.

10. The apparatus of claim 9, wherein the capture context is based at least on information chosen from a set comprising: the location of a house where the audio signal is captured, the number of inhabitants, gender, age, language spoken of inhabitants, and information about pets.

11. The apparatus of claim 9, wherein the capture context is based at least on a type of microphone used for capturing the audio signal.

12. The apparatus of claim 9, wherein the capture context is based at least on acoustic characteristics of a room where the audio signal is captured.

13. The apparatus of claim 9, wherein the capture context is based at least on the presence or absence of guests.

14. The apparatus of claim 9, wherein the capture context is based at least on the day of the week and hour of the day of the capture time.

15. The apparatus of claim 9, wherein the capture context is based at least on data obtained from home automation devices and sensors.

16. The apparatus of claim 9, wherein the capture context is based at least on at least one agenda of an inhabitant.

17. A non-transitory computer-readable medium storing instructions operative, when executed by a processor, to cause the processor to:
- extract vocal features from a captured audio signal representing a user utterance;
- obtain a capture context, the capture context comprising a set of features characterizing a capture environment at a same time of the user utterance;
- obtain a background speaker model selected from a plurality of background speaker models according to the capture context; and
- perform speaker recognition using the selected background speaker model.

* * * * *